United States Patent
Wang

Patent Number: 5,113,445
Date of Patent: May 12, 1992

[54] SYSTEM FOR ENCODING DATA IN MACHINE READABLE GRAPHIC FORM

[75] Inventor: Ynjiun P. Wang, Port Jefferson Station, N.Y.

[73] Assignee: Symbol Technologies Inc., Bohemia, N.Y.

[21] Appl. No.: 653,822

[22] Filed: Feb. 11, 1991

Related U.S. Application Data

[63] Continuation of Ser. No. 550,023, Jul. 9, 1990, abandoned.

[51] Int. Cl.⁵ .............................................. H04L 9/00
[52] U.S. Cl. .................................... 380/51; 235/462
[58] Field of Search ............... 380/55, 51, 3, 59; 235/462

[56] References Cited

U.S. PATENT DOCUMENTS

| | | | |
|---|---|---|---|
| 3,647,275 | 3/1972 | Ward | 283/70 |
| 3,676,644 | 7/1972 | Vaccaro et al. | 235/449 |
| 3,761,683 | 9/1973 | Rogers | 235/380 |
| 3,812,328 | 5/1974 | Tramposch | 235/487 |
| 4,654,718 | 3/1987 | Sueyoshi | |
| 4,654,793 | 3/1987 | Elrod | 235/380 |
| 4,660,221 | 4/1987 | Dlugos | 380/23 |
| 4,794,239 | 12/1988 | Allais | 235/462 |
| 4,835,713 | 5/1989 | Pastor | 380/51 |
| 4,863,196 | 9/1989 | Ohnishi et al. | 283/82 |
| 4,893,333 | 1/1990 | Baran et al. | |
| 4,908,873 | 3/1990 | Philibert et al. | |
| 4,949,381 | 8/1990 | Pastor | 380/51 |
| 4,975,948 | 12/1990 | Andresen et al. | |

FOREIGN PATENT DOCUMENTS

| | | |
|---|---|---|
| 59-44157 | 3/1984 | Japan |
| 62-91075 | 4/1991 | Japan |

*Primary Examiner*—Thomas H. Tarcza
*Assistant Examiner*—David Cain

[57] ABSTRACT

A system for representing and recognizing data in machine readable graphic image form in which data to be encoded is entered into the system and a processor encodes the data into a two-dimensional pattern of graphic indicia and generates transfer drive signals representative of the indicia. A transferring device such as a printer transfers an image of the two-dimensional pattern of graphic indicia onto a carrier such as a card or paper document in responsde to the transfer drive signals. A recognition device converts the image on the carrier into electrical signals representative of the graphic indicia and decodes the signals into output signals representative of the data for further processing or use.

27 Claims, 3 Drawing Sheets

SYSTEM FOR ENCODING DATA IN MACHINE
READABLE GRAPHIC FORM

This is a continuation of application Ser. No. 550,023 filed July 9, 1990 now abandoned.

REFERENCE TO RELATED APPLICATIONS

The present application is related to U.S. patent application Ser. No. 461,881 assigned to the same assignee as the present application.

BACKGROUND OF THE INVENTION

1. Field of the Invention

The present invention generally relates to the representation of data in machine readable form and more particularly to a system for the encryption of data into a two-dimensional graphic image that can be automatically machine read to obtain the encoded data in both open and closed systems.

2. Description of the Prior Art

In todays high technology world more and more operations are being automatically performed by machines and systems. This ever-increasing drive for automation has resulted in a demand for new techniques for encoding data into machine readable form for automatic entry into the various systems and machinery. The data entry may be for such uses as data transmission, operating various machine functions or the identification of persons or items. The various media that carry the data for automatic entry include punch cards, magnetic tapes and discs and magnetic stripes on cards such as Credit Cards and badges. The systems utilizing the above carriers are in "closed" systems, i.e. the read function is performed within an apparatus or housing and the reading element is in contact or in near-contact with the Carrier means during the reading operation.

One method for representing data in a machine readable form is to encode the data into a pattern of indicia having parts of different light reflectivity, for example, ar code symbols. A bar code symbol is a pattern comprised of a series of bars of various widths and spaced apart from one another by spaces of various widths, the bars and spaces having different light reflective properties. The bar code symbol is optically scanned and the resulting electrical signals are decoded into data representative of the symbol for further processing. Bar code reading systems are known as "open" systems in that the carrier while being read is not sealed, but is read from a distance and without being in physical contact with the scanner.

The conventional bar code described above is "one-dimensional" in that the information encoded therein is represented by the width of the bars and spaces, which extend in a single dimension. Similarly data encoded onto other media such as credit card magnetic stripes is composed of one or more "one-dimensional" tracks of encoded data.

The use of bar code symbols and magnetically encoded data has found wide acceptance in almost every type of industry. However, the one dimensional nature of the encoded data limits the amount of information that can be encoded and hence use has been generally restricted to simple digital representations.

Thus, there is a need for a system to encode data in machine readable form that allows for an increase in the amount of data encoded into a given space that can be quickly and easily decoded for further processing.

SUMMARY OF THE INVENTION

The present invention is directed to a system for representing and recognizing data in machine readable graphic image form having an increased capacity for encoded information that can be used in both open and closed systems. The system comprises an encoding means having a means for entering data such as a keyboard or optical character scanner. In addition, the data may be obtained directly from computer files. The data entered into the system may be both textual data and control data. The data is entered into a processing means for encoding the data into a two-dimensional pattern of graphic indicia. The graphic indicia may, for example, be in the form of a two-dimensional bar code which is comprised of a pattern of vertical bars of predetermined lengths that are spaced at various vertical and horizontal intervals. It should be understood that the graphic indicia representative of the data is not limited to a bar code symbol type, but may be in the form of any two-dimensional graphic pattern of indicia suitable for encoding data.

The processing means generates electrical drive signals for transferring the two-dimensional graphic pattern onto a data Carrier means, that may be a card or document or the surface of a machine part. The encoding means also includes means for transferring an image of the two-dimensional pattern of graphic indicia onto the data carrier means in response to the transfer drive signals.

The image may for example be printed in the form of a two-dimensional pattern of graphic indicia having different areas of light reflectivity in which the indicia have one level of reflectivity and the spaces have another level of reflectivity. In this embodiment, the converting means may be a type of optical scanner typically used for scanning one-dimensional bar codes that Converts the areas of different light reflectivity into electrical signals representative of the indicia. Scanners employed in the present invention, however, have the added feature of scanning the indicia in two dimensions. For example, in one method a laser light beam is scanner across the indicia in a raster pattern for reading and decoding two-dimensional graphic codes. Optical scanners suitable for reading two-dimensional patterns are disclosed in U.S. patent application Ser. Nos. 317,433 and 317,533, filed Mar. 1, 1989, assigned to the same assignee as the present invention and incorporated herein by reference.

The system of the present invention further includes a recognition means comprising means for converting the image on the carrier means into electrical signals representative of the graphic indicia and means for decoding the electrical signals into output signals representative of the data.

The decoded output signals are available for further processing and the system may therefore include means for outputting the decoder output signals. Typical output devices may include a liquid crystal display, a CRT display and a printer. The outputted signals may also be transmitted to a computer or other system for further processing and use via telephone lines using a modem or via a data bus.

The present invention contemplates the outputting of the decoder output signals to a microprocessor for controlling the operation of various machines such as facsimile, VCR, microwave oven, robotic systems and weight/price label scale devices.

In another embodiment of the invention, the processing means encodes a first set of data into the two-dimensional pattern of graphic indicia and generates first transfer drive signals for transferring the two-dimensional pattern onto a carrier means. The processing means also generates a second set of transfer drive signals in response to a second set of data entered into the system intended to be transferred to the carrier means in human readable form. Thereafter, the transfer means transfers onto the carrier means both the image of the two-dimensional graphic pattern of indicia in response to the first transfer drive signals and the second set of data in human readable form in response to the second transfer drive signals. Thus, the system provides means for automatically representing data in both a machine readable form and human readable form onto a single carrier means.

In yet another embodiment of the invention, the data is encoded and decoded using a keyed data encryption technique in order to increase the security of the data transmission. In this embodiment, only the person having the encryption key will be able to decode the graphic pattern.

The system of the present invention maximizes the use of available space for encrypting data. In addition to being compact in size, the system provides for high security in the transmission of information. Thus, the invention provides a highly reliable system for representating data in machine readable graphic form having increased encoding capacity thereby substantially expanding applications for automatic data entry. In addition, the invention creates a new media for man-machine interfacing.

DETAILED DESCRIPTION OF THE INVENTION

Figure 1:
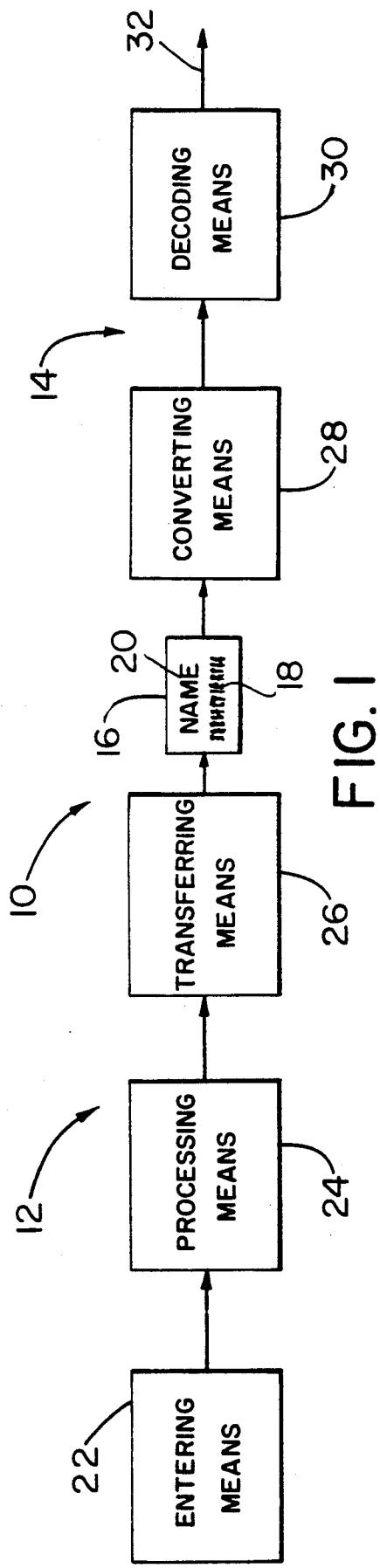
FIG. 1 is a block diagram of the system of the present invention.

Referring now to the drawings, FIG. 1 is a block diagram of the system 10 of the present invention for representing and recognizing data in machine readable graphic image form. System 10 includes an encoding means generally indicated by the reference numeral 12 and a recognition means generally indicated by the reference numeral 14. Encoding means 12 produces a carrier means 16 containing at least a two-dimensional pattern of graphic indicia 18. Carrier means 16 may also contain human readable data 20. The two-dimensional pattern of graphic indicia on carrier means 16 is recognized by recognition means 14 to produce output signals representative of the data encoded into the pattern 18.

Data to be transferred onto carrier means 16 is entered by entering means 22 into the encoding means 12.

The data entered by entering means 22 may be both the data to be encoded into the two-dimensional pattern of graphic indicia and the data to appear on carrier means 16 in human readable form. Processing means 24 encodes the set of data to appear in pattern 18 into a two-dimensional pattern of graphic indicia and generates transfer drive signals for controlling the transfer of the indicia onto the carrier means 16. Transferring means 26 transfers an image of the two-dimensional pattern of graphic indicia onto carrier means 16 in response to the transfer drive signals. If human readable data is also to be transferred onto carrier 16, the processing means 24 generates a second set of transfer drive signals for controlling the transfer of the human readable data onto carrier 16. A portion or all of the data to be encoded and the human readable data may be transferred from a storage memory in processing means 24 or other computer files rather than being entered by means 22.

Figure 2:
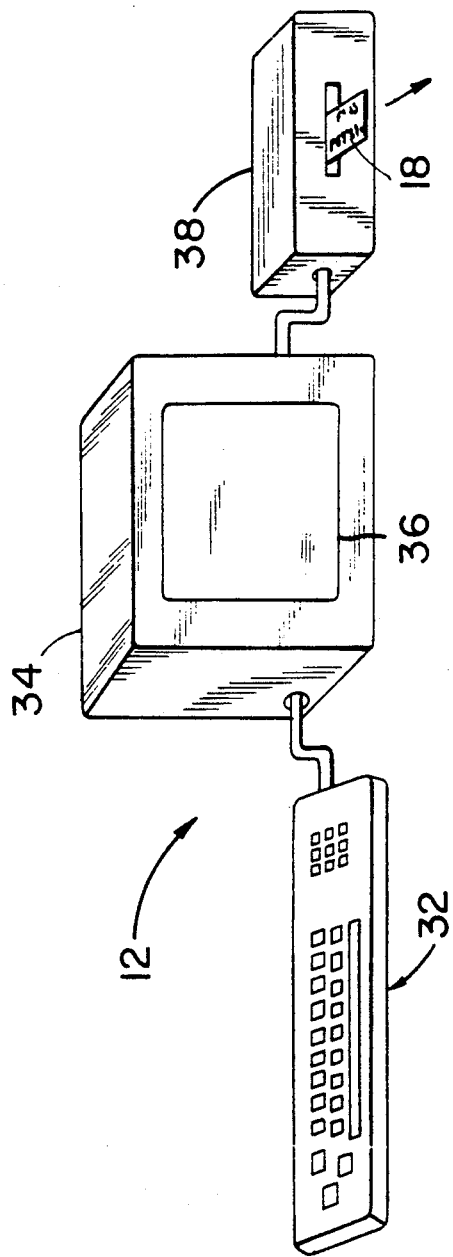
FIG. 2 is a perspective view of an encoding means of the system of the present invention.
Figure 3:
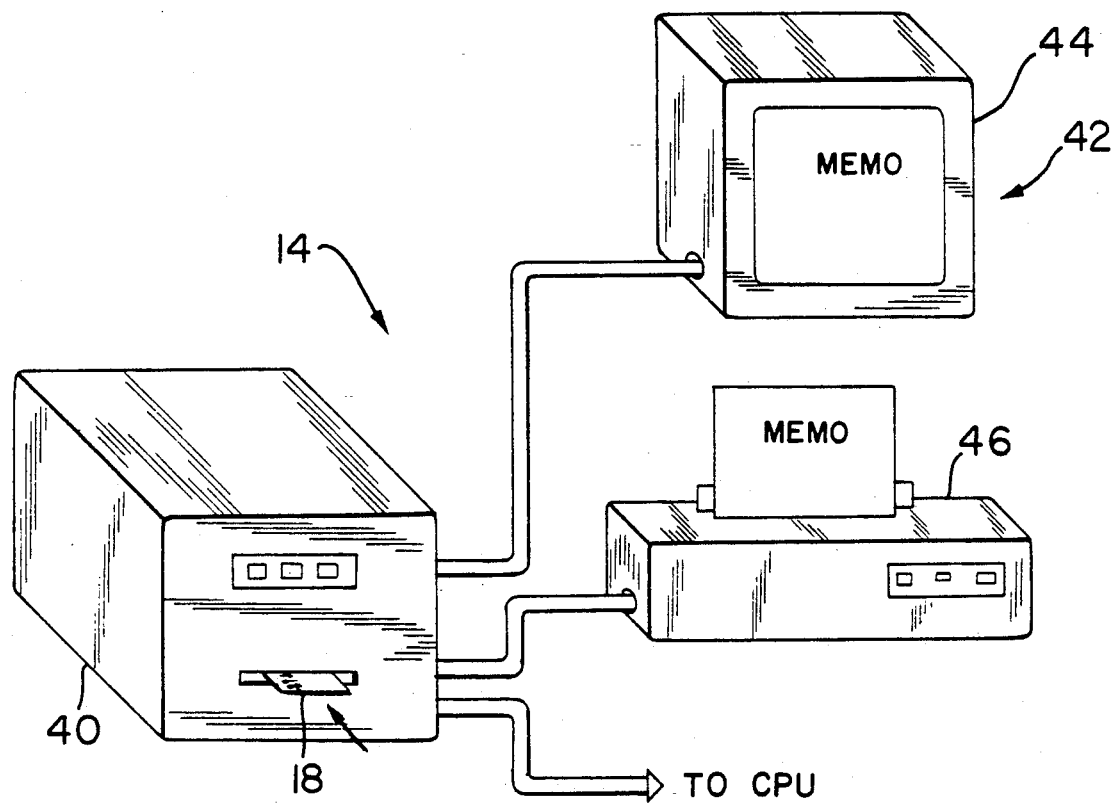
FIG. 3 is a perspective view of a recognition means of the system of the present invention.

The carrier means 16 is shown in FIGS. 1, 2 and 3 is represented as being in the form of a card approximately the size of a credit card. This type of card is illustrative only as the carrier means 18 may be made of any material on which graphic indicia may be transferred to, such as paper, etc.

Recognition means 14 includes converting means 28 that converts the image on carrier means 16 into electrical signals representative of the graphic indicia. Decoding means 30 decodes the electrical signals into decoder output signals indicated at 32 that are representative of the data encoded into the pattern 18.

FIG. 2 is a perspective view of one embodiment of encoding means 12. In this embodiment, the entering means 22 of FIG. 1 is shown in form of a keyboard 32 for entering alphanumeric and graphic data into the decoding means 12. The embodiment of FIG. 2 is illustrative only as entering means 22 may take forms other than a keyboard such as an optical scanning means for scanning data directly from documents for entry into the encoding means 12. Entering means 22 may also be in the form of various card readers in which magnetically encoded information is scanned and converted into electrical signals representative of the data.

Referring again to FIG. 2, the processing means 24 of FIG. 1 is shown in the form of a processor and display unit 34. The data entered by keyboard 32 is transmitted to the processor and display unit 34 for storage and processing. In addition to entering data, the keyboard 32 is also used for entering control commands to effect operation of the processor unit 34.

The data entered by keyboard 32 is displayed on display screen 36 and upon entry of a proper control command, is also stored in memory. The data to be encoded into the pattern of graphic indicia is stored in a first memory, in processor 34 and the data, if any, to be transferred in human readable form is stored in a second memory. Alternatively, the data may be stored in a separate portion of a single memory. Upon the appropriate control command from keyboard 32, the processor unit 34 encodes the data in the first memory into a two-dimensional pattern of graphic indicia and generates first transfer drive signals representative of the data stored in the first memory. The processor unit 34 also generates second transfer drive signals representative of the data stored in the second memory.

The processor unit 34 is shown in FIG. 2 as being coupled to a printer 38. The printer 38 is one form of the transferring means 26 of FIG. 1. Printer 38 transfers an image of the two-dimensional pattern of graphic indicia on carrier means 18 in response to the first transfer drive signals and prints the second set of data in human readable form onto carrier means 18 in response to the second transfer drive signals. In one embodiment, the printer 38 prints the two-dimensional pattern in the form of graphic indicia having different areas of light reflectivity, such as a two-dimensional bar code. Printer 38 may take other forms such as a means for printing the two-dimensional pattern of graphic indicia with magnetic-ink. In such a device, magnetic indicia are deposited on the carrier material in a two-dimensional pattern that may be recognized by magnetic-ink recognition sensors.

Turning now to FIG. 3, the recognition means 14 includes a card reader 40 which contains the converting means 28 and the decoding means 30 of FIG. 1. The converting means 28 may be a bar code reader such as those disclosed in U.S. patent application Ser. Nos. 317,433 and 317,533, assigned to the same assignee as the present invention and incorporated herein by reference. The readers disclosed in the above patent applications are open system devices designed to read an optically encoded two-dimensional bar code and to convert the light reflected from the pattern into electrical signals representative of the graphic indicia.

The card reader 40 may also comprise a magnetic-ink recognition device for reading and decoding magnetically encoded data. These closed system devices include a magnetic read head that senses the change in reluctance associated with the presence of the magnetic-ink. The use of appropriate converting means that corresponds to the particular data encoding technology employed is contemplated by the present invention.

The decoding means 30 decodes the electrical signals into output signals representative of the data encoded onto carrier means 18. The decoder output signals are outputted from the recognition unit 40 to various output means 42. FIG. 3 depicts two examples of output devices; one being a display unit 44 and the other a printer 46. Display unit 44 may be any suitable display such as liquid crystal display or a CRT. The printer 46 may be any print device such as a dot matrix printer, laser printer, etc.

The system of the present invention maximizes the use of available space for encrypting data. The density of the encoded data is such that for a two-dimensional bar code symbol, a minimum of about 1600 characters can be encoded into a space of approximately $5'' \times \frac{1}{2}''$. In addition to being compact in size, the system provides for high security in the transmission of information. For example, a sensitive message may be encoded onto a document also containing non-sensitive material. This document, the same as any document, can be copied, transmitted by facsimile, etc., but only those with a recognition means of the present invention will be able to "read" the sensitive portion. The carrier means, being a single sheet of paper or a plastic credit card type of card, is an inexpensive read-only-memory structure that facilitates data communication.

Figure 4:
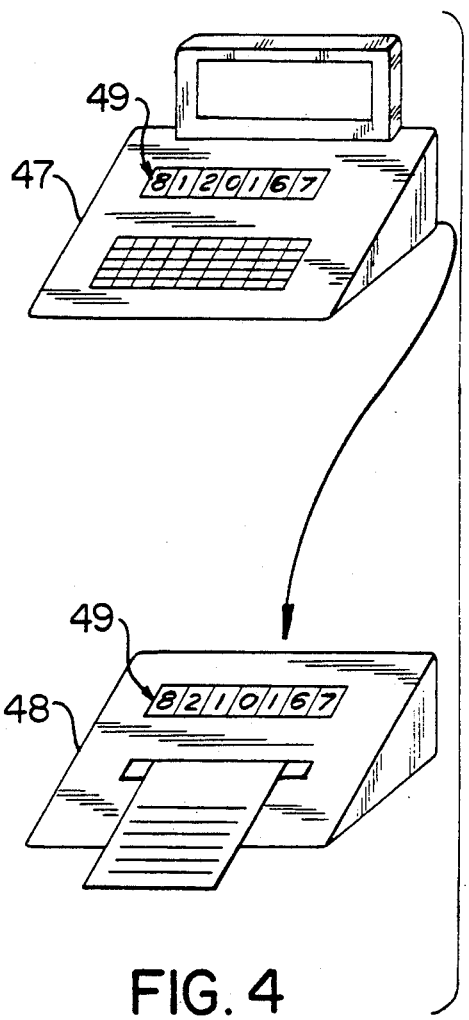
FIG. 4 is a perspective view of a data entry device and a reader in which a key may be entered for encrypting and decrypting data.

In another embodiment, the data may be encoded using a keyed encryption algorithm that may be accessed only by an encryption key. As shown in FIG. 4, the data entry means 47 contains the keyed algorithm and upon entry of the key 49, the data will be encoded into a two-dimensional graphic pattern in a unique configuration. The unique configuration can only be read by a reader 48 having the algorithm and only upon entry of the key 49 into the reader. Thus, a high degree of security may be provided with the keyed encryption embodiment.

In addition, the recognition unit 40 may also transmit the output signals to a central processing unit locally or remotely, by for example a modem, for further use or processing by the CPU. In this embodiment, the data encoded onto the carrier means 18 may be control data in the form of machine operating instructions for controlling a robotic system or to a security identification system for performing such functions as unlocking doors. In connection with the use of the present invention in a robotic system, it is contemplated that the two-dimensional graphic pattern containing the Control data be placed or printed directly onto a machine part or part holder. A scanner coupled to the machine tool reads the pattern and transmits the decoded instruction to the control computer which in turn controls the machining of the part in accordance with the control program. Another example of the use of the present invention includes a microwave food container where the two-dimensional graphic pattern contains instructions automatically entering the recommended cooking sequence. A further use may be in connection with placing on roadway signs two-dimensional patterns containing geographic location information that may be read by a scanner in passing vehicles for use with on-board computers.

Figure 5:
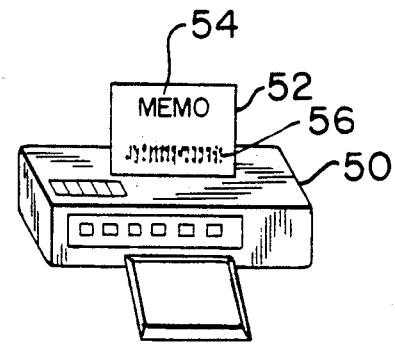
FIG. 5 is a perspective view of a facsimile machine incorporating the recognition means of the present invention.

The present invention further contemplates the use of the system of the present invention to encode control data containing machine operating instructions onto the carrier means in the form of machine readable graphic indicia that may be inserted into the machine to effect operation of the machine. FIG. 5 is an example of a facsimile machine 50 in which a document 52 containing human readable data 54 and a two-dimensional pattern of graphic machine readable indicia 56. The document 52 is inserted into the facsimile machine 50 the same as documents are normally inserted for transmission. The machine 50 contains a converting means for converting the two-dimensional image into electrical signals and a decoding means for decoding the signals into output signals operative to actuate the facsimile machine 50. The pattern 56 may contain such information as the phone number of the intended recipient of the memo 54 and the appropriate instructions for automatically entering the phone number and actuating the transmission process. Thus, where numerous messages are faxed to a particular recipient a supply of paper containing the phone number of the recipient encoded in the two-dimensional graphic indicia machine readable format may be maintained by the sender. The transmission of messages to that recipient will be facilitated by placing the message onto the pre-encoded paper and simply inserting the paper into the facsimile machine. In addition to simplifying and speeding the transmission process, the possibility of sending highly sensitive information to an incorrect party will also be eliminated.

Figure 6:
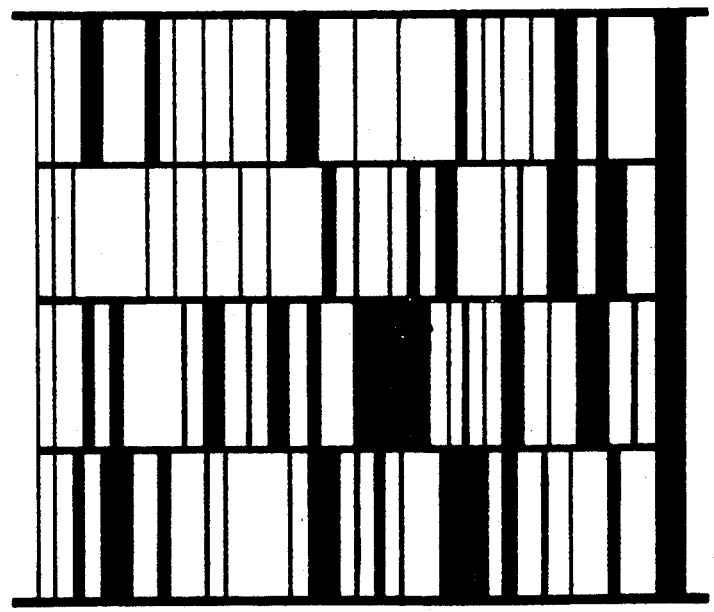
FIG. 6 is a representation of an embodiment of a two dimensional bar code as the term is used in this patent specification.

FIG. 6 is a representation of an embodiment of a two dimensional bar code as the term is used in this patent specification. Such a bar code, taken from Allais, U.S. Pat. No. 4,794,239, includes a plurality of ordered rows of codewords of bar code information, one row adjacent to and beneath another row, each codeword representing at least one information bearing character.

While the invention has been particularly shown and described with respect to preferred embodiments thereof, it will be understood by those skilled in the art that the foregoing and other changes in form and detail may be made therein without departing from the spirit and scope of the invention which should be limited only by the scope of the appended claims.

What is claimed is:

1. A system for representing and recognizing data on a record carrier in the form of a machine readable two-dimensional bar code structure comprising:
   (a) encoding means including:
      (i) means for entering data in said encoding means;
      (ii) processing means for encoding said data into a two-dimensional bar code structure, said bar code structure including a plurality of ordered, adjacent rows of codewords of bar-coded information, each of said codewords representing at least one information-bearing character, and for generating first transfer drive signals;
      (iii) means for transferring an image of the two-dimensional bar code structure onto a portable record carrier in response to said first transfer drive signals; and
   (b) recognition means including:
      (i) means for scanning the image of the two-dimensional bar code structure and for converting the codewords into electrical signals representative of the information-bearing characters; and
      (ii) means for decoding the electrical signals into output signals representative of said data.

2. The system of claim 1 wherein said recognition means includes an output device for displaying said data in human readable form.

3. The system of claim 2 wherein said output device is a liquid crystal display.

4. The system of claim 2 wherein said output device is a CRT display.

5. The system of claim 2 wherein said output device is a printer.

6. The system of claim 1 wherein said recognition means includes means for transmitting the decoder output signals to a computer.

7. The system of claim 6 wherein said transmitting means includes a modem.

8. The system of claim 1 wherein said recognition means includes means for transmitting the decoder output signals to a microprocessor.

9. The system of claim 8 wherein the microprocessor controls the operation of one of a facsimile machine, a VCR, a microwave oven, a robot and a weight/price label scale, in response to said decoder output signals.

10. The system of claim 11 wherein said entering means includes a keyboard for entering said data.

11. The system of claim 1 wherein said entering means includes means for scanning data from a sheet.

12. The system of claim 11 wherein said processing means includes means for generating second transfer drive signals in response to a second set of data, and wherein said transferring means includes reading means for transferring onto said carrier means both the image of the two-dimensional bar code structure in response to the first transfer drive signals and said second set of data in human readable form in response to said second transfer drive signals.

13. The system of claim 1 wherein the transferring means is a printer.

14. The system of claim 12 wherein said portable record carrier is a single carrier, and wherein said reading means includes signal means for transferring the two-dimensional bar code structure and the second set of data in human readable form onto the portable carrier.

15. A method for representing and recognizing data on a record carrier in the form of a machine readable two-dimensional bar code structure comprising the steps of:
   (i) entering said data into an encoding station;
   (ii) encoding said data into a two-dimensional bar code structure, said bar code structure including a plurality of ordered, adjacent rows of codewords of bar-coded information, each of said codewords representing at least one information-bearing character;
   (iii) transferring an image of the two-dimensional bar code structure onto a portable record carrier;
   (iv) scanning the image of the two-dimensional bar code structure in a separate decoding station and converting the codewords into electrical signals representative of the information-bearing characters; and
   (v) decoding the electrical signals into output signals representing said data.

16. The method of claim 15 wherein said entering step includes the substep of entering said data on a keyboard.

17. The method of claim 15 wherein said entering step includes the substep of scanning said data from a sheet.

18. The method of claim 15 wherein said transferring step includes the substep of printing the image onto the carrier.

19. The method of claim 15 further comprising the step of displaying the data in human readable form.

20. The method of claim 19 wherein said displaying step includes the substep of displaying the data on a CRT display.

21. The method of claim 19 wherein said displaying step includes the substep of displaying the data on a liquid crystal display.

22. The method of claim 19 wherein said displaying step includes the substep of printing the data on a printer.

23. The method of claim 15 further comprising the step of transmitting the output signals to a computer.

24. The method of claim 23 wherein said transmitting step includes the substep of transmitting the output signals to the computer by a modem.

25. The method of claim 15 further comprising the step of transmitting the output signals to a microprocessor.

26. The method of claim 25 further comprising the step of controlling the operation of one of a facsimile machine, a VCR, a microwave oven, a robot and a weight/price label scale, in response to the output signals.

27. The method of claim 15 further comprising the steps of
   entering a second set of data into the encoding station; and
   transferring onto the portable record carrier both the image of the two-dimensional bar code structure and said second set of data in human readable form.

* * * * *